(12) United States Patent
Song et al.

(10) Patent No.: US 6,781,651 B2
(45) Date of Patent: Aug. 24, 2004

(54) THIN FILM TRANSISTOR SUBSTRATE HAVING BLACK MATRIX AND METHOD FOR FABRICATING THE SAME

(75) Inventors: Jang-Kun Song, Seoul (KR); Yong-Woo Choi, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 132 days.

(21) Appl. No.: 09/853,642

(22) Filed: May 14, 2001

(65) Prior Publication Data

US 2002/0008798 A1 Jan. 24, 2002

(30) Foreign Application Priority Data

May 12, 2000 (KR) ......................................... 2000-25468

(51) Int. Cl.[7] .......................................... G02F 1/1333
(52) U.S. Cl. ........................ 349/111; 349/44; 349/110; 349/138; 349/139
(58) Field of Search ........................... 349/44, 110, 111, 349/122, 138, 139, 143

(56) References Cited

U.S. PATENT DOCUMENTS

| | | | | |
|---|---|---|---|---|
| 5,128,786 A | * | 7/1992 | Yanagisawa | 349/111 |
| 5,510,916 A | | 4/1996 | Takahashi | 359/67 |
| 5,926,235 A | * | 7/1999 | Han et al. | 349/43 |
| 5,956,103 A | * | 9/1999 | Ishiguro | 349/38 |
| 6,297,862 B1 | * | 10/2001 | Murade | 349/44 |

FOREIGN PATENT DOCUMENTS

JP 7-159786 6/1995 ......... G02F/1/1337

* cited by examiner

Primary Examiner—Robert H Kim
Assistant Examiner—Andrew Schechter
(74) Attorney, Agent, or Firm—McGuireWoods LLP (57) ABSTRACT

In a method of fabricating a thin film transistor array substrate, a black matrix having separated portions is first formed on a substrate with an opaque conductive material. An insulation layer is formed to cover the black matrix. A gate line assembly and a data line assembly are formed over the black matrix and insulation layer. Buffer layers are formed to cover the gaps between the separate portions of the black matrix. The buffer conductive layers are formed at the same plane as the gate line assembly or data line assembly.

3 Claims, 13 Drawing Sheets

THIN FILM TRANSISTOR SUBSTRATE HAVING BLACK MATRIX AND METHOD FOR FABRICATING THE SAME

BACKGROUND OF THE INVENTION (a) Field of the Invention

The present invention relates to a thin film transistor (TFT) array substrate for liquid crystal displays and a method for fabricating the same and, more particularly, to a TFT array substrate of good performance characteristics.

(b) Description of the Related Art

Generally, a liquid crystal display (LCD) is formed with two glass substrates, and a liquid crystal sandwiched in-between the substrates.

One of the substrates has a common electrode, a color filter and a black matrix, and the other substrate has pixel electrodes and thin film transistors (TFTs). The former substrate is usally called the "color filter substrate," and the latter substrate called the "TFT array substrate."

The TFT array substrate is fabricated through forming a plurality of thin films, and performing photolithography with respect to the thin films. In photolithograpy, a number of masks are used for uniformly etching the thin films, involving complicated processing steps and increased production cost. Therefore, reduction in the number of masks becomes a critical factor in the fabrication of the TFT array substrate.

On the other hand, the color filter substrate is provided with a black matrix. The black matrix should be formed with a predetermined degree of marginal width considering the possible alignment error when assembling the color filter substrate and the TFT array substrate. However, the wider black matrix reduces the opening ratio. Therefore, it is required to increase the opening ratio of the black matrix while maintaining other performance characteristics in a stable manner.

SUMMARY OF THE INVENTION

It is an object of the present invention to provide a method for fabricating a TFT array substrate for a LCD which involves reduced number of masks while simplifying the processing steps.

It is another object of the present invention to provide a method for fabricating a TFT array substrate with an increased device opening ratio.

These and other objects may be achieved in the flollowing way.

A mesh-shaped black matrix is formed under the TFTs with opening portions at pixel areas. A gate insulating layer and a protective layer are etched at the step of forming a semiconductor pattern while forming contact holes for interconnecting conductive layers.

Specifically, a black matrix is formed on a first substrate while being mesh-shaped with opening portions at pixel areas. An insulating layer is formed on the substrate while covering the black matrix. A gate line assembly is formed on the insulating layer. The gate line assembly includes gate lines proceeding in the horizontal direction, and gate electrodes connected to the gate lines. A gate insulating layer, and a semiconductor layer are sequentially deposited onto the substrate. An ohmic contact layer is formed on the semiconductor layer, and a data line assembly is formed on the ohmic contact layer. The data line assembly includes source and drain electrodes separated from each other, and data lines connected to the source electrodes while crossing over the gate lines to define the pixel areas. A protective layer is deposited onto the substrate while covering the data line assembly and the gate line assembly. The protective layer, the gate insulating layer, and the semiconductor layer are patterned to thereby form opening portions exposing the insulating layer at the pixel areas.

Pixel electrodes are formed on the protective layer such that they are connected to the drain electrodes. First contact holes exposing the drain electrodes are formed at the step of forming the opening portioins, and the connection of the pixel electrodes to the drain electrodes is made through the first contact holes.

The black matrix is separated into a number of portions, and buffer layers are positioned between the neighboring separate portions of the black matrix. The buffer layers are placed at the same plane as the gate line assembly or the data line assembly.

Each pixel electrode has a peripheral portion overlapped with the black matrix. The protective layer is formed in the same shape as the gate insulating pattern and the semiconductor pattern except the first contact holes. The borderlines of the protective layer, the gate insulating pattern, and the semiconductor pattern are placed over the black matrix except the area where the drain electrodes are present.

The gate line assembly further includes gate pads connected to the gate lines to receive scanning signals from the outside and transmit the scanning signals to the gate lines. The gate insultaing pattern, the semiconductor pattern and the protective layer have second contact holes exposing the gate pads.

The data line assembly further includes data pads connected to the data lines to receive picture signals from the outside and transmit the picture signals to the data lines. The gate insultaing pattern, the semiconductor pattern and the protective layer have third contact holes exposing the data pads.

Subsidiary gate and data pads may be formed at the same plane as the pixel electrodes such that the subsidiary gate and data pads are connected to the gate and data pads through the second and third contact holes.

Buffer conductive layers may be formed at the same plane as the data line assembly or the pixel electrodes while being positioned over the semiconductor pattern between the neighboring data lines.

In case the buffer conductive layer is placed at the same plane as the data line assembly, second contact holes are formed at the protective layer such that they expose the gate lines and the buffer conductive layers, and a connection pattern is formed at the same plane as the pixel electrodes. The connection pattern connects the gate lines to the buffer conductive layers through the second contact holes.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
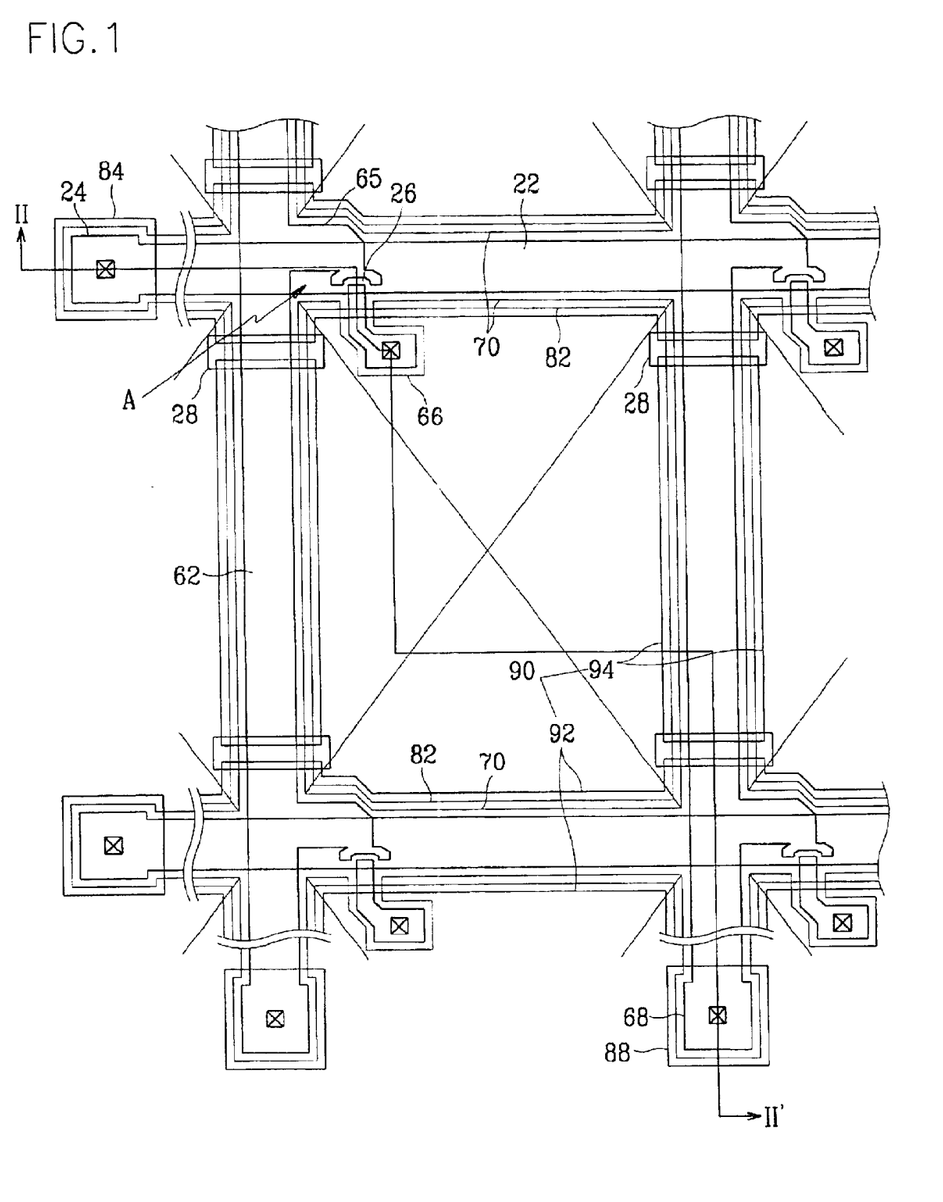
FIG. 1 is a plan view of a TFT array substrate for a liquid crystal display according to a preferred embodiment of the present invention.
Figure 2:
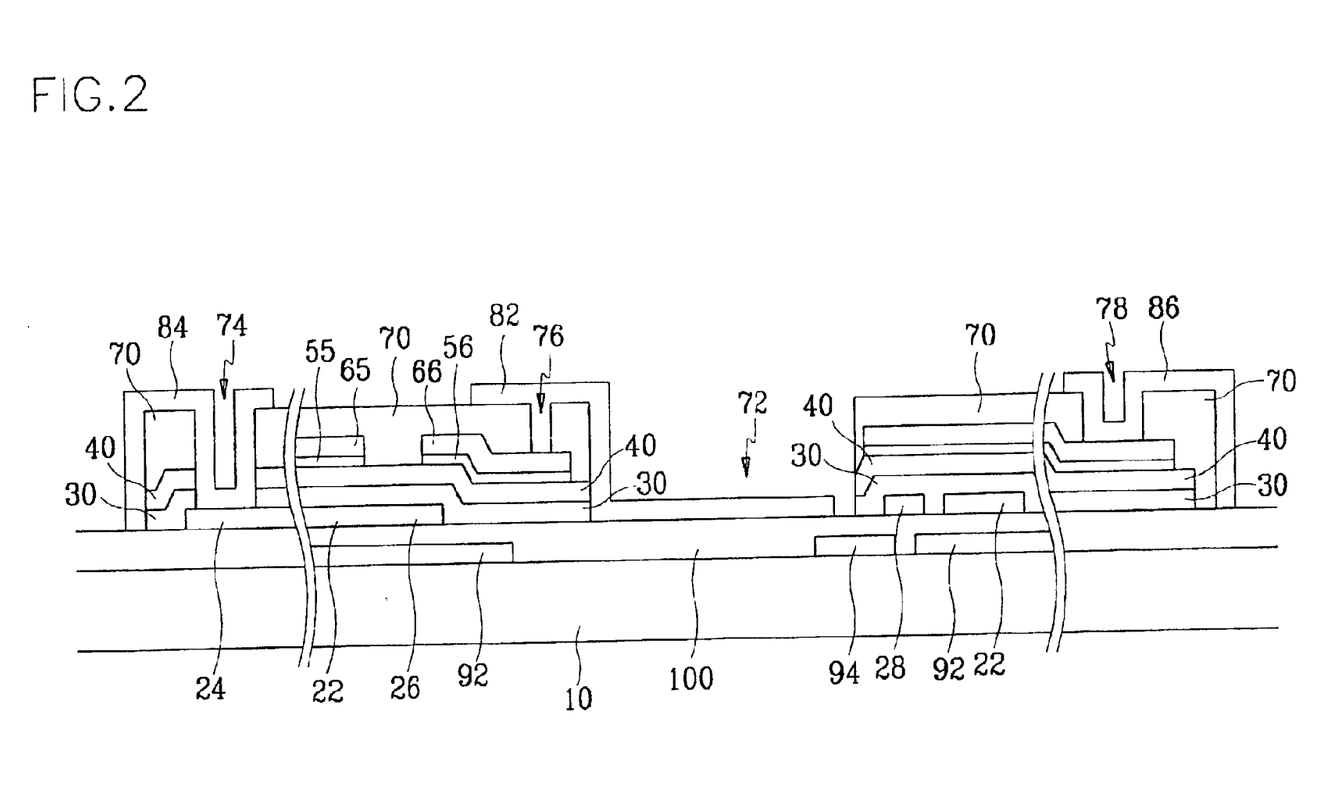
FIG. 2 is a cross sectional view of the TFT array substrate taken along the II–II' line of FIG. 1.

FIG. 1 is a plan view of a TFT array substrate for a liquid crystal display according to a preferred embodiment of the present invention, and FIG. 2 is a cross sectional view of the TFT array substrate taken along the II–II' line of FIG. 1.

As shown in the drawings, a black matrix 90 is formed on the TFT array substrate 10 with opaque conductive material, chrome nitride, or molybdenum nitride. The black matrix 90 may have a single-layered structure or a multiple-layered structure. The black matrix 90 is mesh-shaped with opening portions at pixel areas. The black matrix 90 has horizontal portions 92 and vertical portions 94 separated from each other. The black matrix 90 has a role of preventing leakage of light between the pixel areas. The black matrix 90 may vary in shape to prevent the light incident upon a semiconductor pattern 40 for the TFTs. Separation of the horizontal and vertical portions 92 and 94 of the black matrix 90 is to prevent scanning signals transmitted to gate lines 22 overlapped with the horizontal portions 92 from being interfered with or delayed due to data signals transmitted to data lines 62 overlapped with the vertical portions 94. In this preferred embodiment, such a separation is made through dividing the vertical portions 94 into plural numbers of sub-portions, but may be also made through dividing the horizontal portions 92 or dividing both of the horizontal and vertical portions 92 and 94.

An insulating layer 100 is formed on the substrate 10 while covering the black matrix 90. It is preferable that the insulating layer 100 is formed with silicon oxide having a lower dielectric constant of 3.0–4.0 while bearing a sufficient thickness of 0.5–3.0 μm. This is to minimize signal delays transmitted to a gate line assembly and a data line assembly due to the black matrix 90.

The gate line assembly is formed on the insulating layer 100 with a conductive material or a metallic material such as Al, Al alloy, Mo, MoW, Cr, Ta, Cu, and Cu alloy while proceeding in the horizontal direction. The gate line assembly includes gate lines 22 overlapping with the horizontal portions 92 of the black matrix 90, gate pads 24 for transmitting scanning signals or gate signals to the gate lines 22, and gate electrodes 26 connected to the gate lines 22 to form the TFTs. The gate line assembly may overlap pixel electrodes 82 to form storage capacitors. In case such a structure do not produce sufficient storage capacity, additional storage capacitor lines may be provided at the same plane as the gate line assembly while overlapping the pixel electrodes 82 to form such storage capacitors. Buffer layers 28 are formed at the same plane as the gate line assembly between the horizontal and vertical portions 92 and 94 of the black matrix 90 while partially overlapping them.

A gate insulating pattern 30 is formed on the insulating layer 100 with silicon nitride while covering the gate line assembly and the buffer layers 28. A semiconductor pattern 40 for the TFTs is formed on the gate insulating layer 30 with hydrogenated amorphous silicon. Ohmic contact layers 55 and 56 are formed on the semiconductor pattern 40 with amorphous silicon doped with n-type impurities such as phosphorous P, micro-crystallized silicon, or metal silicide while being separated from each other.

A data line assembly is formed on the ohmic contact layers 55 and 56 with a conductive material having a lower resistance based on aluminum, copper, or silver. The data line assembly includes data lines 62 proceeding in the vertical direction while defining the pixel areas together with the gate lines 22, data pads 68 connected to one end of the data lines 62 to receive picture signals from the outside, source electrodes 65 branched from the data lines 62 to form the TFTs while positioning on one of the ohmic contact layers 55, and drain electrodes 66 separated from the source electrodes 65 while interposing the gate electrodes 26 between them to form the TFTs. The drain electrodes 66 are positioned on the other ohmic contact layer 56.

As with the gate line assembly, the data line assembly may be formed with a conductive material having a lower resistance while bearing a single-layered structure or a multiple-layered structure. When the data line assembly has a double-layered structure, it is preferable that one layer is formed with a material having a lower resistance, and the other layer with a material having a good contact characteristic with other materials.

The ohmic contact layers 55 and 56 has the same shape as the data line assembly. In case the horizontal portions 92 of the black matrix 90 are divided into a number of sub-portions, additional buffer layers may be provided at the same plane as the data line assembly to prevent light leakage at the gap between the sub-portions of the horizontal portions 92.

A protective layer 70 is formed on the data line assembly. The protective layer 70 is formed with silicon nitride or acryl-based organic insulating material while bearing contact holes 76 exposing the drain electrodes 66. The protective layer 70 has contact holes 78 exposing the data pads 68, and contact holes 74 exposing the gate pads 24 together with the semiconductor pattern 40 and the gate insulating pattern 30. The protective layer 70 is further provided with opening portions 72 exposing the gate insulating pattern 30, the semiconductor pattern 40, and the insulating layer 100 at the pixel areas. The opening portion 72 of the protective layer 70 at each pixel area reaches up to the periphery of the black matrix 90 except the portion of the protective layer 70 with the underlying drain electrode 66.

The protective layer 70 is formed with an outline similar to the gate insulating pattern 30 and the semiconductor pattern 40. Particularly, except the contact holes 76 and 78, the protective layer 70 is formed with the same shape as the gate insulating pattern 30 and the semiconductor pattern 40. The protective layer 70, the gate insulating pattern 30, and the semiconductor pattern 40 are shaped along the outlines of the gate line assembly and the data line assembly, and altogether have a shape similar to the black matrix 90 except the portion shaped along the outline of the drain electrodes 66. In case additional storage capacitor lines are provided at the same plane as the gate line assembly, additional portions of the protective layer 70 covering the storage capacitor lines as well as the underlying gate insulating pattern and semiconductor pattern may be formed.

Pixel electrodes 82 are formed on the insulating layer 100 exposed through the opening portions 72 to receive picture signals from the TFTs and form electric fields together with a common electrode of the color filter substrate. The pixel electrodes 82 are formed with a transparent conductive material such as indium tin oxide (ITO) and indium zinc oxide (IZO). The pixel electrodes 82 are coupled to the drain electrodes 66 through the contact holes 76, and receives picture signals from the drain electrodes 66. The pixel electrodes 82 may be overlapped with the neighboring gate lines 22 to form storage capacitors.

Meanwhile, subsidiary gate pads 84 and subsidiary data pads 88 are connected to the gate pads 24 and the data pads 68 through the contact holes 74 and 78 to strengthen adhesion thereof to external circuits while protecting them, but may be omitted.

In the above structure, since the black matrix 90 is formed at the TFT array substrate 10 with the pixel electrodes 82, the width of the black matrix 90 may be minimized without considering the alignmenterror, enhacing the opening ratio.

Meanwhile, the black matrix 90 may be centrally provided with an opening portion while minimizing the overlapped area of the gate lines 22 and the data lines 62 to prevent signal transmission delay.

The above structure may be applied to various types of liquid crystal display devices such as an in-plane switching mode liquid crystal display where the common electrode and the pixel electrodes form electric fields parallel to the substrates, a vertical alignment mode liquid crystal display where liquid crystal molecules are aligned normal to the substrates with negative dielectric anisotropy, or a wide viewing angle liquid crystal display where the common electrode is patterned with opening or protruded portions, and the liquid crystal molecules are oriented in all directions due to fringe fields.

The method of fabricating the TFT array substrate will be now described with reference to FIGS. 3A to 6B.

Figure 3A:
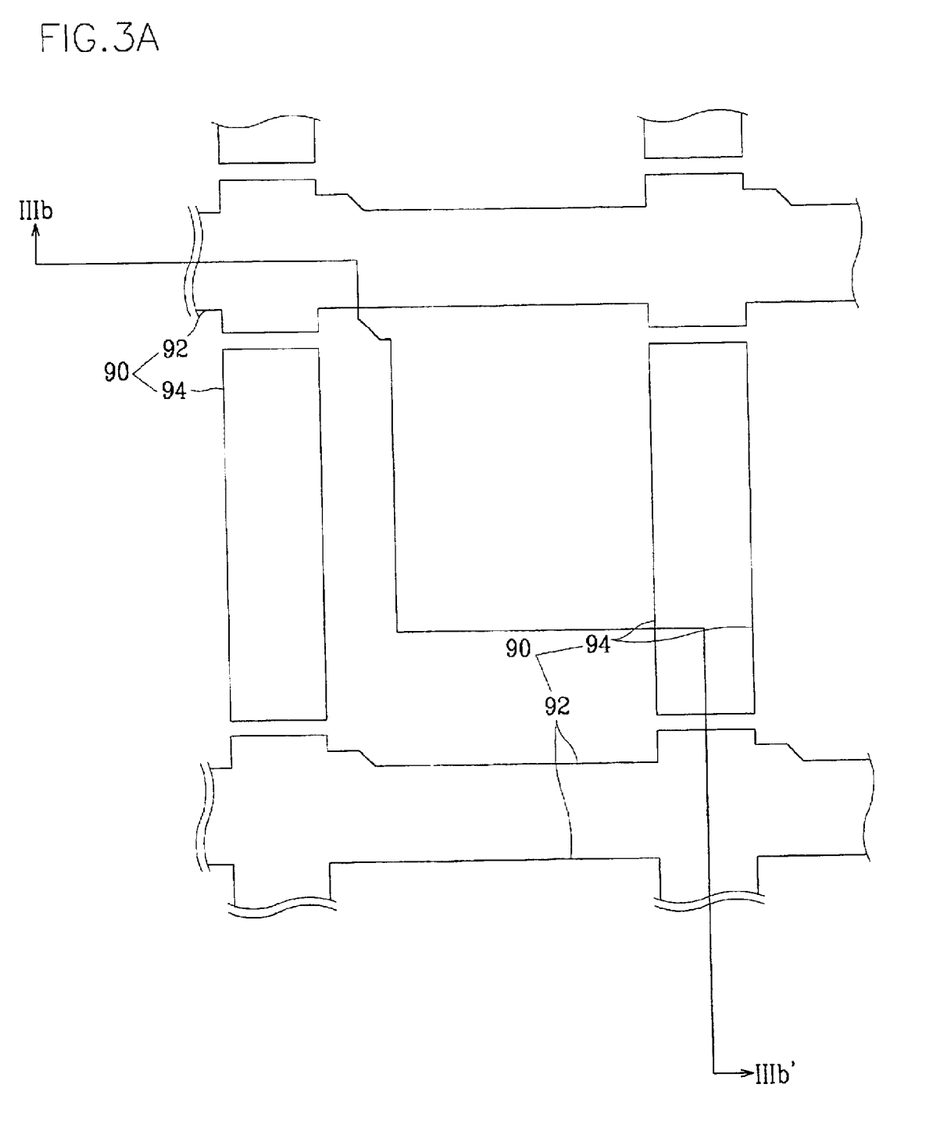
FIGS. 3A, 4A, 5A and 6A illustrates the steps of fabricating the TFT array substrate shown in FIG. 1 in a sequential manner.
Figure 3B:
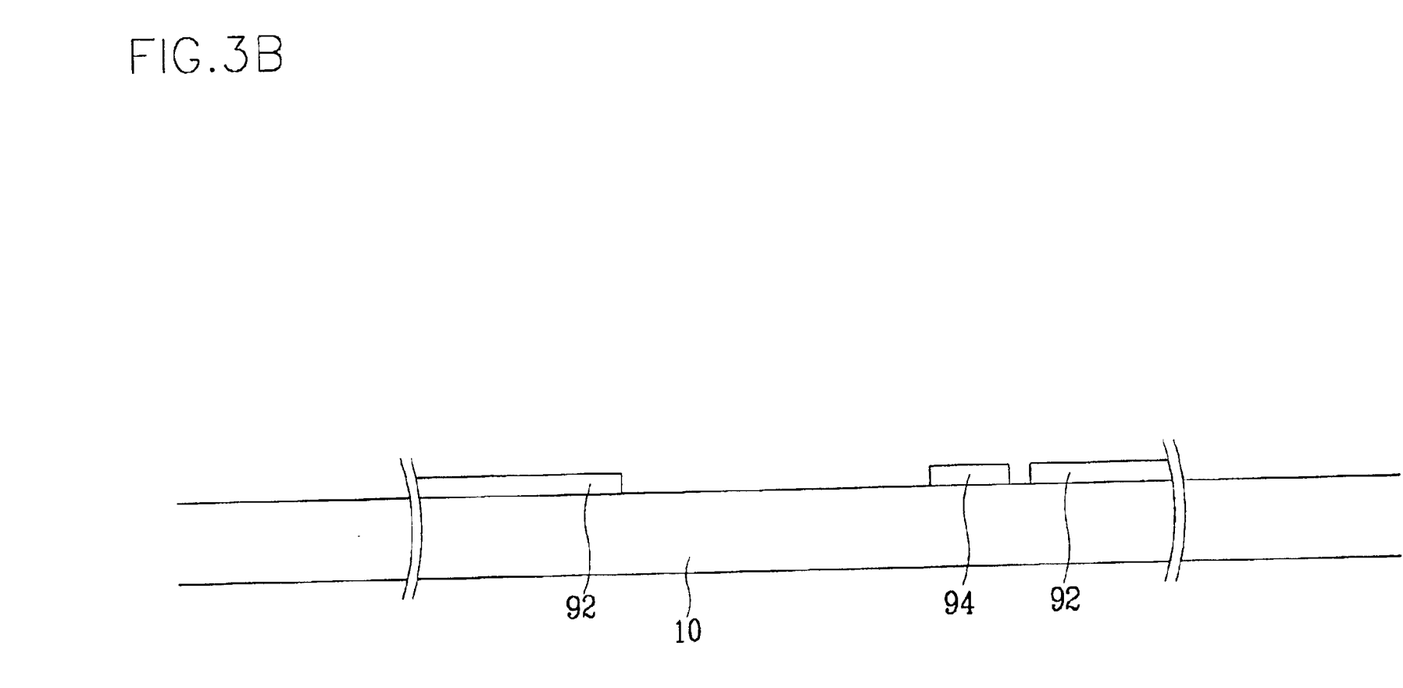
FIGS. 3B, 4B, 5B and 6B are cross sectional views of the TFT array substrate taken along the IIIb–IIIb' line of FIG. 3A, the IVb–IVb' line of FIG. 4A, the Vb–Vb' line of FIG. 5A, and the VIb–VIb' line of FIG. 6A, respectively.

As shown in FIGS. 3A and 3B, an opaque conductive material such as chrome is deposited onto the TFT array substrate 10 through sputtering, and dry or wet-etched to form a black matrix 90 with horizontal portions 92 and vertical portions 94.

The conductive material for the black matrix 90 may be selected from aluminum, aluminum alloy, copper, copper alloy, silver, chrome, molybdenum, titanium, or chrome nitride.

Figure 4A:
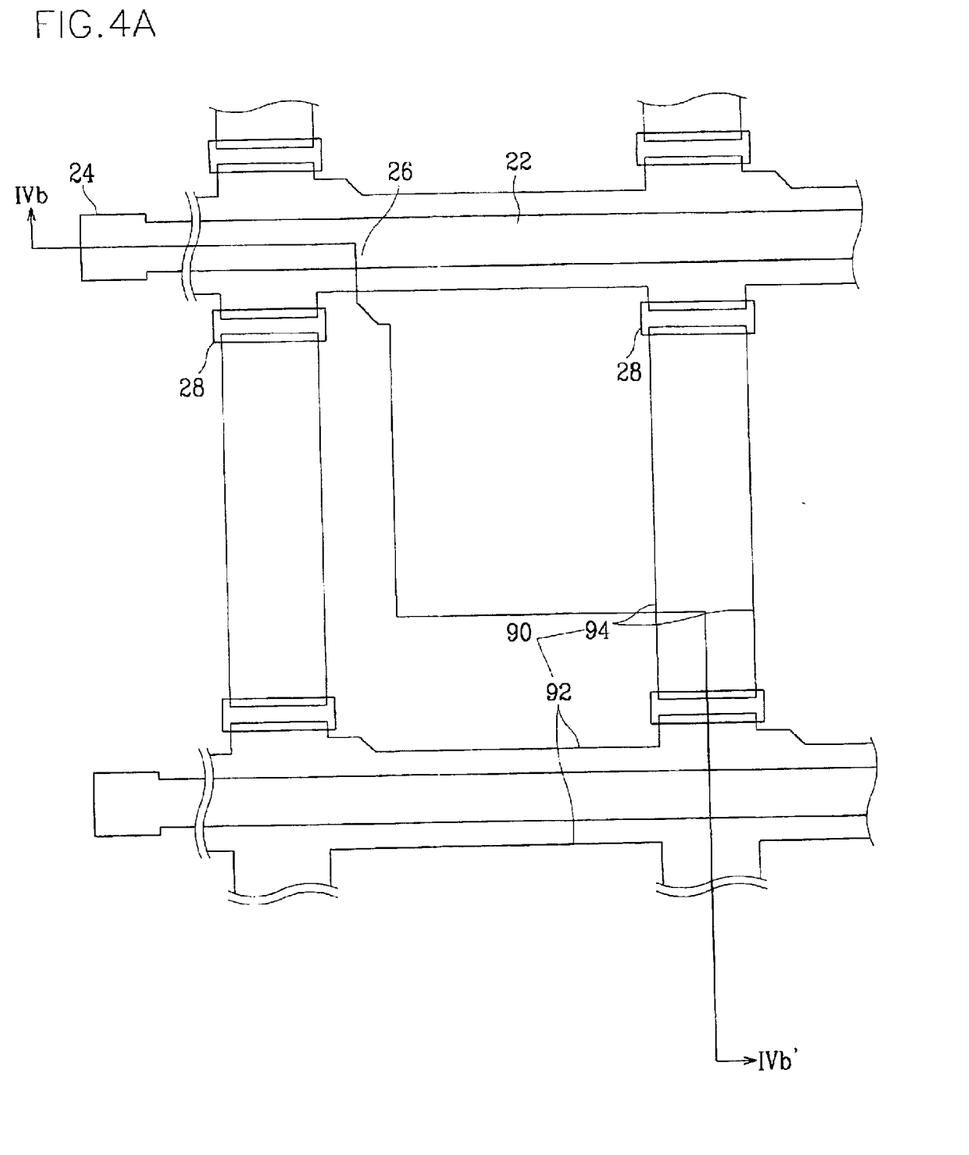
Figure 4B:
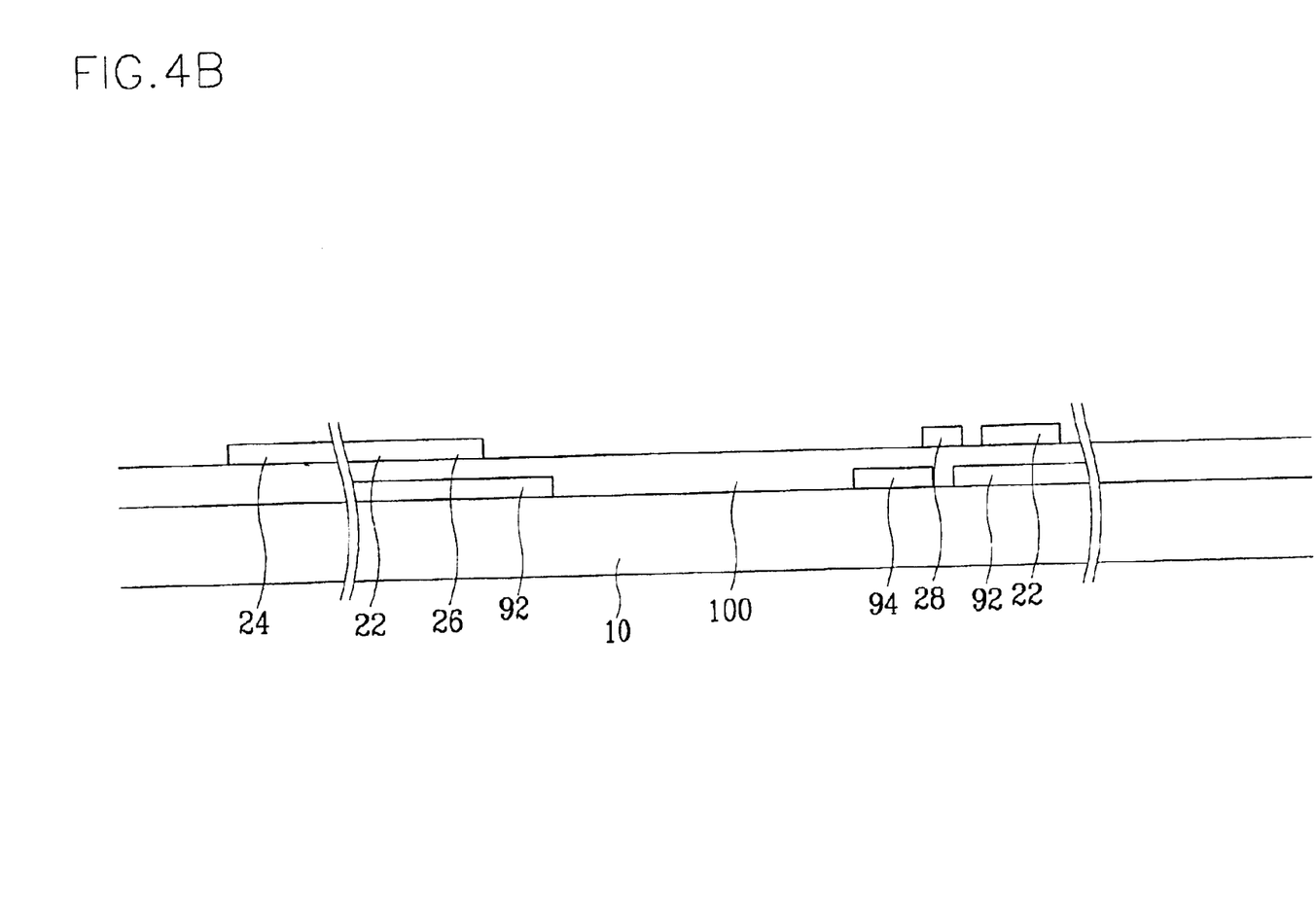

As shown in FIGS. 4A and 4B, an insulating layer 100 is formed on the substrate 10 with an organic material having a good planar characteristic, or silicon nitride having a lower dielectric constant. Thereafter, a conductive material having a lower resistance such as Mo, MoW, Cr, Ta, Al, Al alloy, Cu, Cu alloy, and silver is deposited onto the insulating layer 100 through sputtering, and dry or wet-etched through photolithography to form a gate line assembly and buffer layers 28. The gate line assembly includes gate lines 22, gate electrodes 26, and gate pads 24. The gate line assembly has a double-layered structure with a chrome-based under-layer, and an aluminum-based over-layer.

Figure 5A:
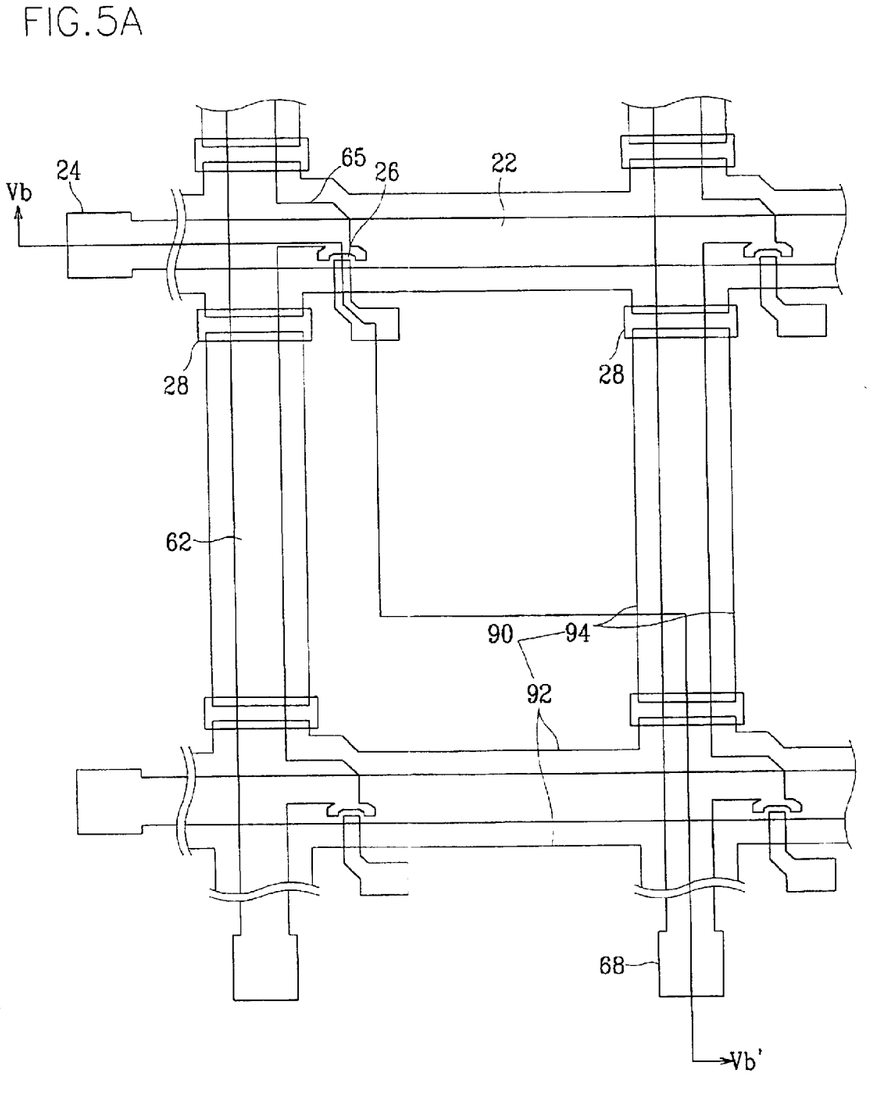
Figure 5B:
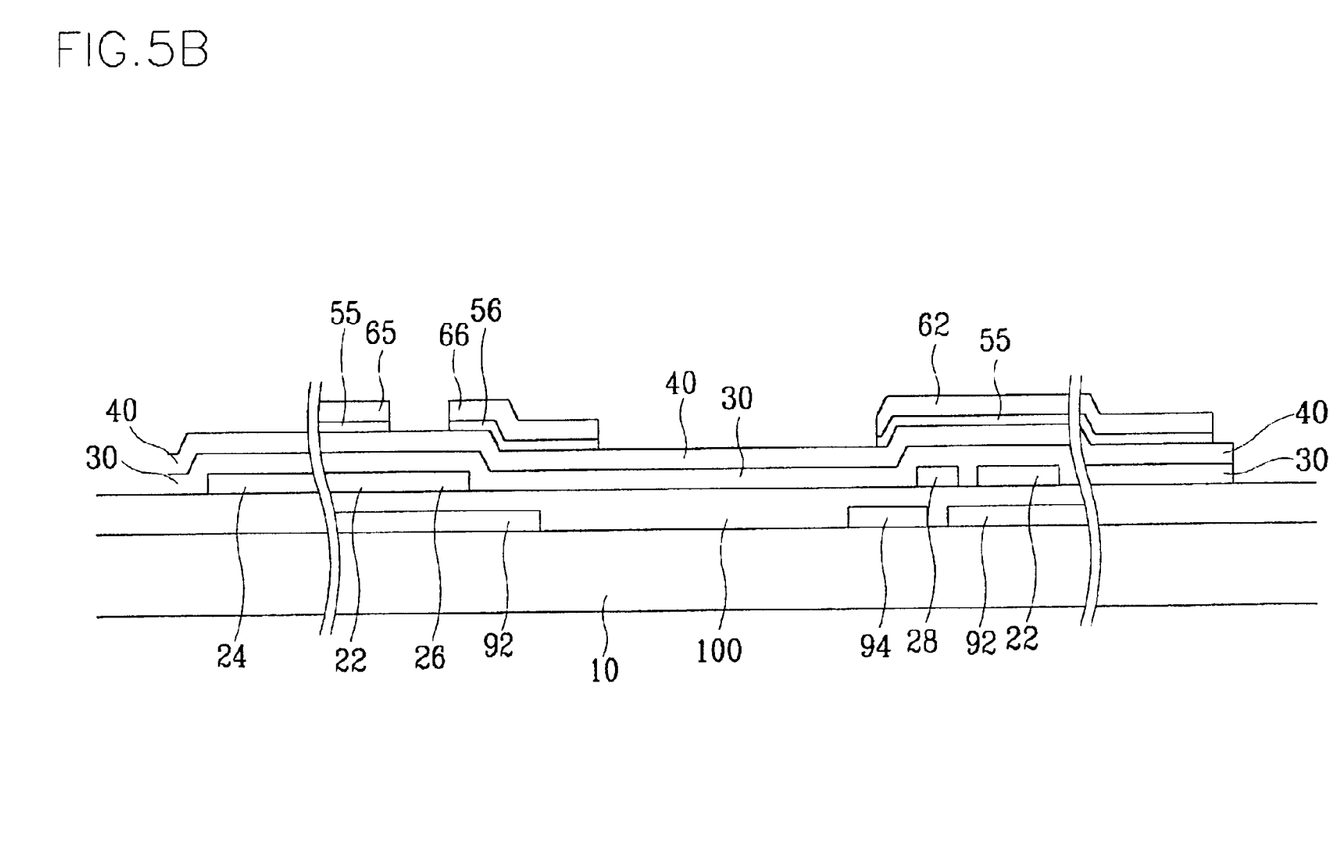

Then, as shown in FIGS. 5A and 5B, a gate insulating layer 30, a semiconductor layer 40, and an ohmic contact layer 50 are sequentially deposited onto the substrate 10 through chemical vapor deposition. A conductive material as used in forming the gate line assembly is deposited onto the ohmic contact layer 50, and dry or wet-etched through photolithography to form a data line assembly. The data line assembly includes data lines 62 defining the pixel areas while crossing over the gate lines 22, source electrodes 65 branched from the data lines 62 while extending over the gate electrodes 26, data pads 68 connected to one ends of the data lines 62, and drain electrodes 66 separated from the source electrodes 65 while interposing the gate electrodes 26 between them. In case the horizontal portions 92 of the black matrix 90 are divided into a number of sub-portions, additional buffer layers may be formed between the sub-portions of the horizontal portions to prevent light leakage there. The data line assembly has a double-layered structure with a chrome-based under-layer and an aluminum-based over-layer.

Thereafter, the ohmic contact layer 50 exposed through the data line assembly is etched to be separated into ohmic contact patterns 55 and 56 around the gate electrode 26 while exposing the semiconductor layer 40 between them.

Figure 6A:
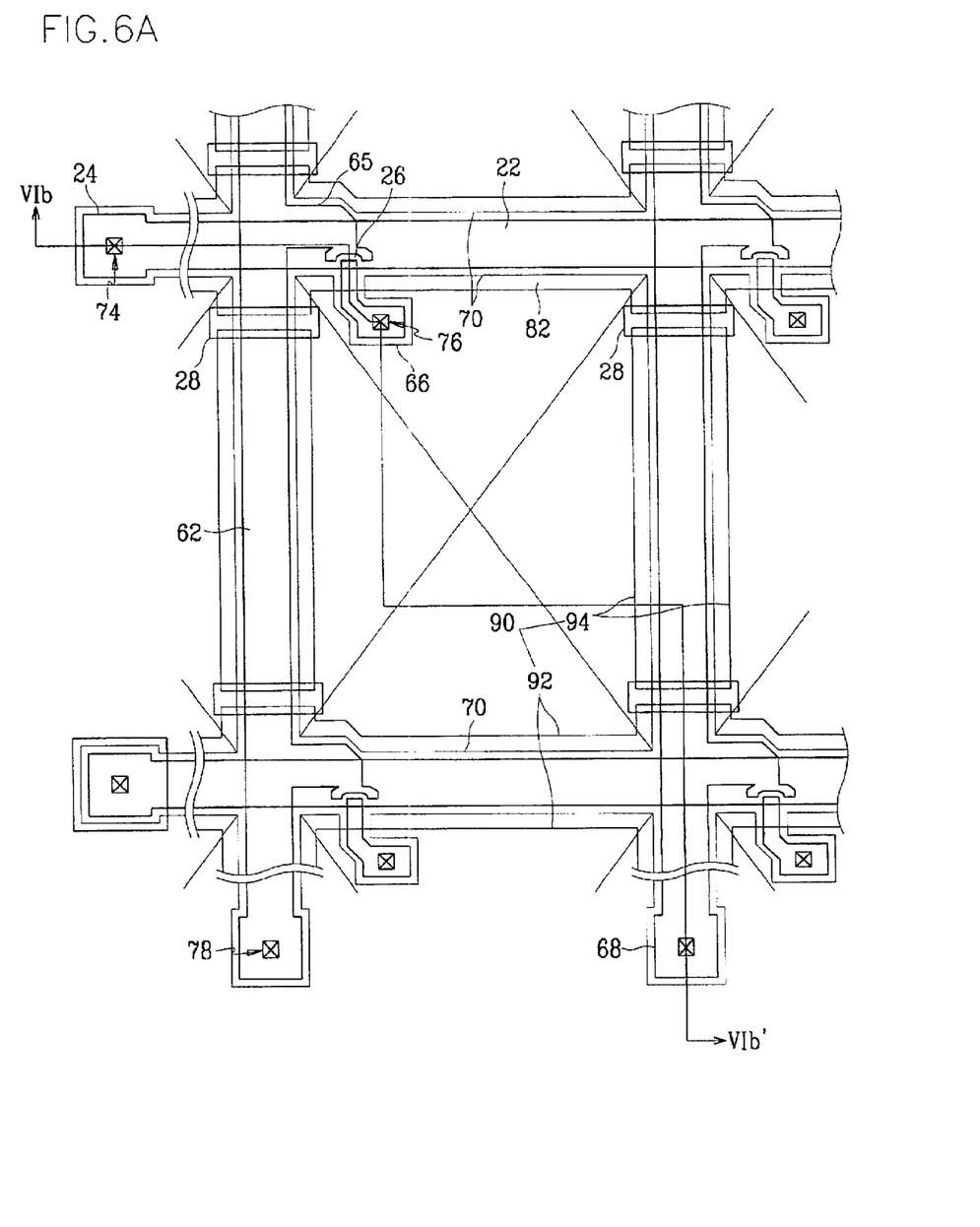
Figure 6B:
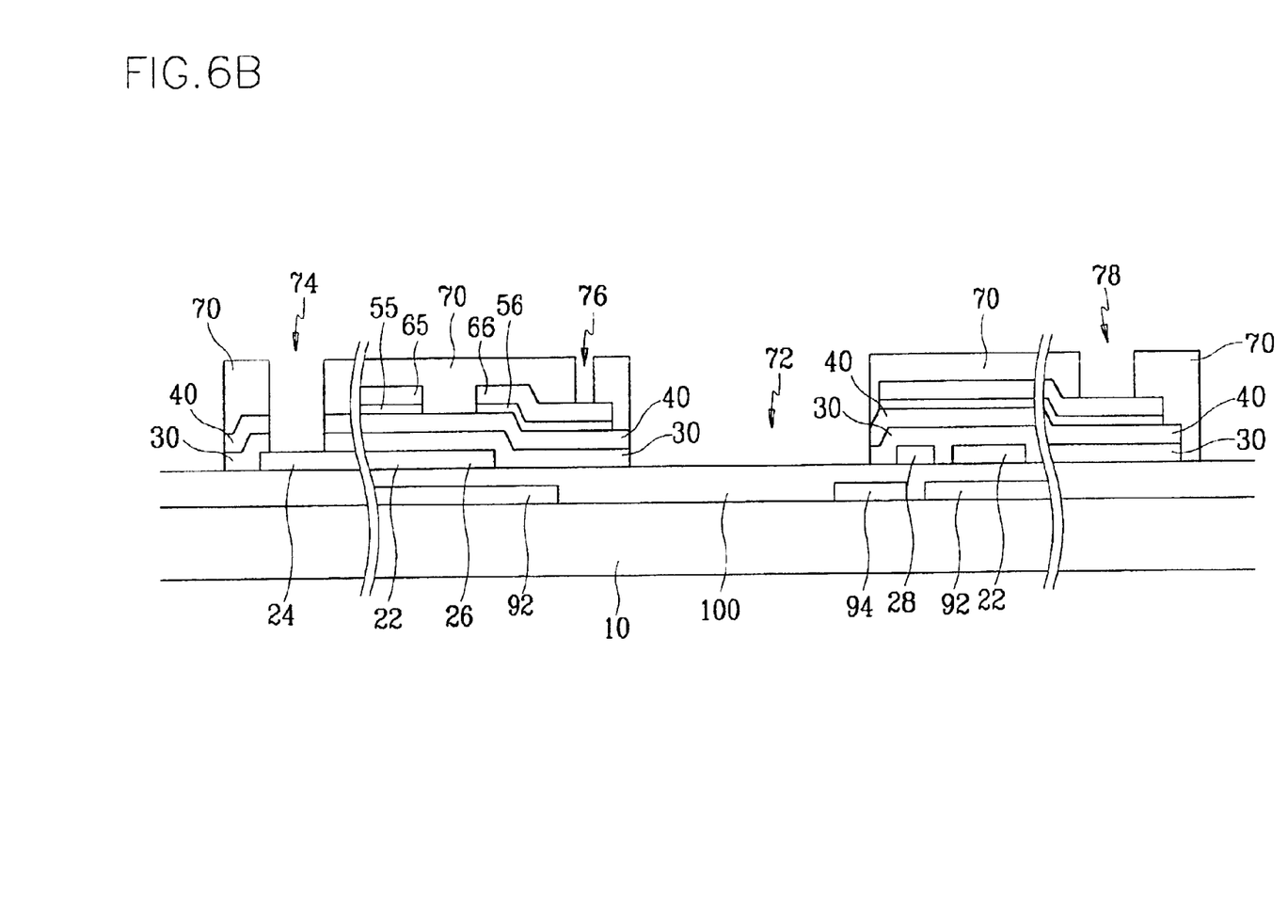

As shown in FIGS. 6A and 6B, a protective layer 70 is deposited onto the substrate 10 with silicon nitride, and dry-etched together with the gate insulating layer 30 and the semiconductor layer 40 to form a semiconductor pattern 40 and a gate insulating pattern 30. The semiconductor pattern 40 and the gate insulating pattern 30 have contact holes 74, 76 and 78 exposing the gate pads 24, the drain electrodes 66 and the data pads 68. At this time, opening portions 72 exposing the insulating layer 100 at the pixel areas are formed together such that they expose the peripheral portions of the black matrix 90 at the pixel areas.

Thereafter, as shown FIGS. 1 and 2, pixel electrodes 82, subsidiary gate pads 84, and subsidiary data pads 88 are formed at the substrate 10 through depositing and patterning an IZO-based layer such that the pixel electrodes are connected to the drain electrodes 66 through the contact holes 76, and the subsidiary gate and data pads 84 and 88 are connected to the gate pads 24 and the data pads 68 through the contact holes 74 and 78, respectively. In case the pixel electrodes 82, the subsidiary gate pads 84 and the subsidiary data pads 88 are formed with ITO having a poor contact characteristic with aluminum, it is preferable that the neighboring aluminum-based layer is removed. In this preferred embodiment, since IZO is used for that purpose, the aluminum-based layer may be formed in contact with the IZO-based layer.

In the above process, the black matrix is formed at the TFT array substrate so that possible errors in aligning the TFT array substrate and the color filter substrate can be avoided while enhancing opening ratio. Furthermore, since the contact holes 74 and 78 exposing the pads and the semiconductor pattern are formed together, only five masks are required while simplifying the processing steps.

In case the protective layer 70, the semiconductor pattern 40 and the gate insulating layer 30 are patterned along the outlines of the gate line assembly and the data line assembly to simplify the processing steps, the semiconductor pattern 40 is continuously formed over the gate line assembly 22 and 26 as shown in FIGS. 1 and 2. In this structure, when gate signals are applied to the gate line assembly 22 and 26, channels may be formed at regions other than the channel regions between the source electrodes 65 and the drain electrodes 66. That is, such channels are formed in the semiconductor pattern 40 at the A regions between the data lines 62 and the source electrodes 65, and over the gate lines 22 between the neighboring data lines 62.

Current may leak at the A regions due to the light incident from a blacklight (being a light source for the device). However, in this preferred embodiment, since the horizontal portions 92 of the black matrix 90 are formed under the semiconductor pattern 40 at the A regions, the light incident thereto from the bottom side can be intercepted. Therefore, current does not leak at the A regions.

Possible leakage of current occurring at the semiconductor pattern 40 over the gate lines 22 between the neighboring data lines 62 will be now explained in detail by way of simulation.

Figure 7:
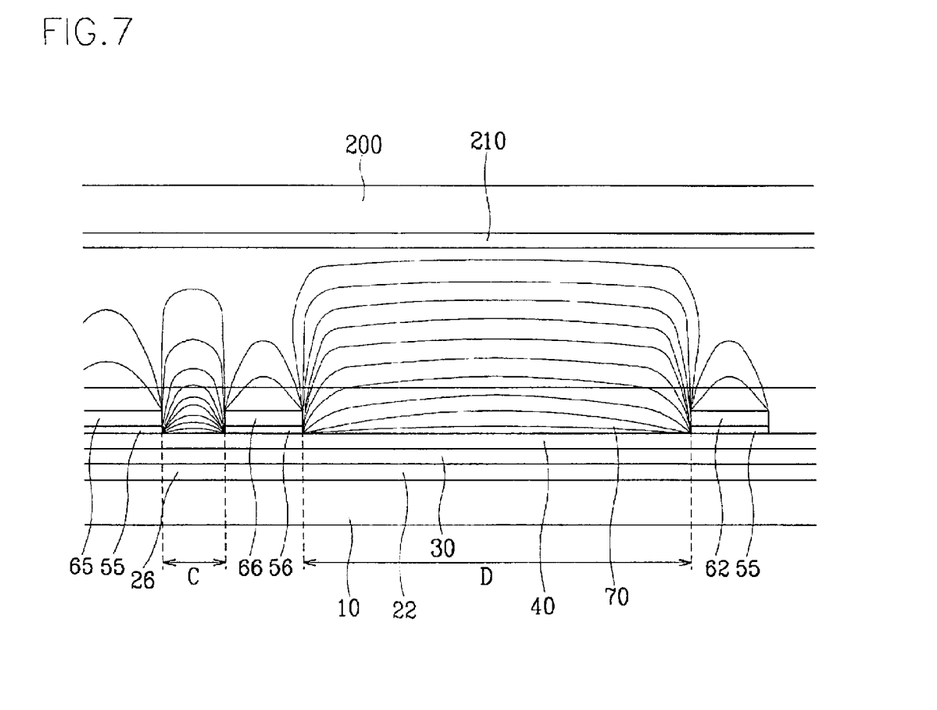
FIGS. 7 to 9 schematically illustrates the structure of a gate line assembly placed between neighboring data lines of the TFT array substrate shown in FIG. 1.
Figure 8:
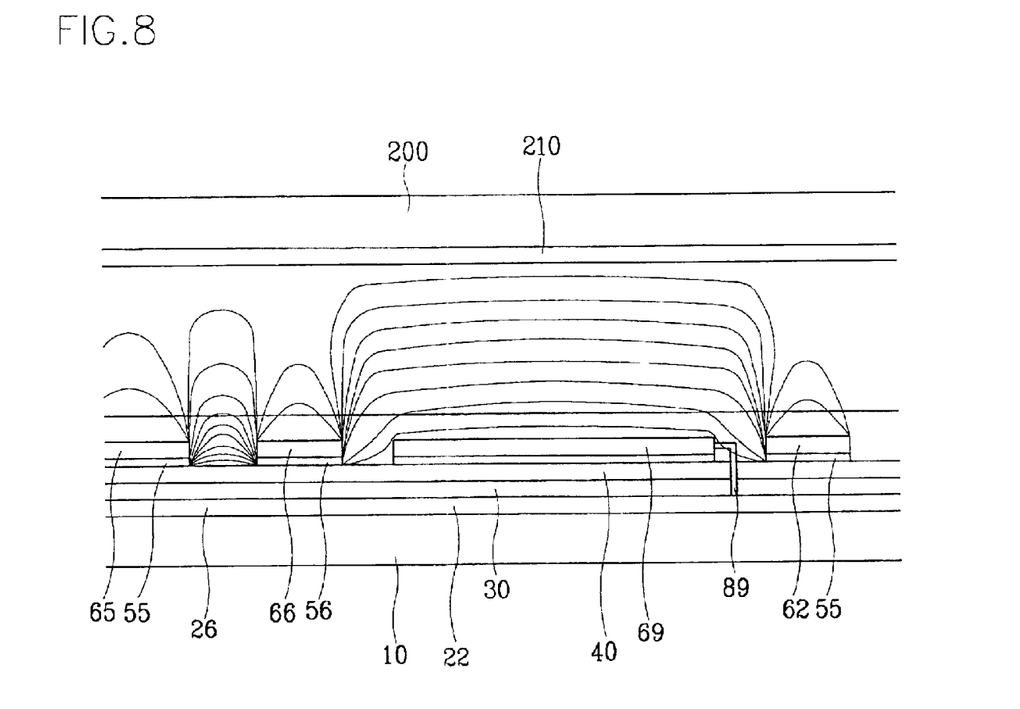
Figure 9:
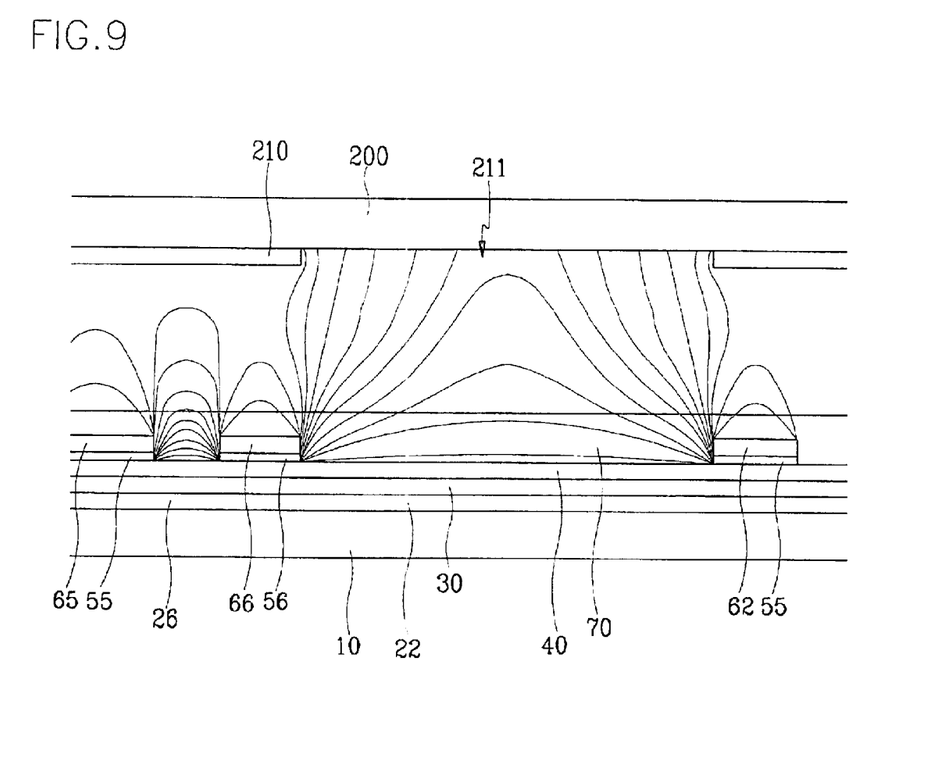

FIGS. 7, 8 and 9 schematically illustrate the structure of the gate line assembly between the neighboring data lines at one pixel area. In the drawings, the color filter substrate is illustrated together with the TFT array substrate.

As shown in FIG. 7, the TFT array substrate 10 is sequentially overlaid with the gate line assembly 22 and 26, the gate insulating layer 30, the semiconductor pattern 40, the ohmic contact layer 55 and 56, the data line assembly 62, 65 and 66, and the protective layer 70.

Meanwhile, a common electrode 210 is formed at the entire surface of the color filter substrate 200 facing the TFT array substrate 10.

As shown in FIG. 8, a buffer conductive layer 69 is formed over the semiconductor pattern 40 between the neighboring data lines 62 while being connected to the gate lines 22 through a connection pattern 89. As shown in FIG. 9, an opening portion 211 is formed at the common electrode 210 over the semiconductor pattern 40 between the neighboring data lines 62.

As shown in FIG. 7, since the semiconductor pattern 40 is formed at the channel region C over the gate electrode 26 as well as at the region D over the gate line 22, current may leak at the semiconductor pattern 40 at the D region when scanning signals are applied to the gate line assembly 22 and 26. However, as shown in the drawing, the channel region C is under the strong influence of the electric field due to the gate signals applied to the gate line assembly 22 and 26, but such an influence of the electric field is weak at the D region far away from the drain electrodes 66 and the data lines 62. As shown in FIG. 8, when the buffer conductive layer 69 connected to the gate line assembly 22 and 26 is formed over the semiconductor pattern 40 between the neighboring data lines 62, the electric field due to the gate signals transmitted to the gate line assembly 22 and 26 does not influence the semiconductor pattern 40. Therefore, as the current passage is not formed in the semiconductor pattern 40 at the D region, current does not leak there. In case the buffer conductive layer 69 is formed with an opaque material, it also intercepts the light incident upon the semiconductor pattern 40 through the upper substrate 200 so that leakage of current at the semiconductor pattern 40 due the incidence light can be minimized. The buffer conductive layer 69 may be formed at the same plane as the data line assembly, or at the same plane as the pixel electrodes 82. In this preferred embodiment, the buffer conductive layer 69 is formed at the same plane as the data line assembly. The contact holes exposing the buffer conductive layer 69 and the gate lines 22 are formed at the step of forming the contact holes 74, 76 and 78, and the opening portions 72. The connection pattern 89 electrically connecting the buffer conductive layer 69 to the gate lines 22 through the contact holes is formed at the step of forming the pixel electrode 82. Of course, in case the buffer conductive layer 69 is formed at the same plane as the pixel electrodes 82, the contact holes exposing the gate lines 22 are formed at the step of forming the contact holes 74, 76 and 78 and the opening portions 72, and the buffer conductive layer 69 is formed at the step of forming the pixel electrodes 82. Furthermore, as shown in FIG. 9, in case the opening portion 211 is formed at the common electrode 210 over the semiconductor pattern 40 between the neighboring data lines 62, the influence of the electric field to the semiconductor pattern 40 due to the gate signals can be further reduced while completely intercepting the passage of current leakage at the D region.

As described above, the black matrix is formed at the TFT array substrate with the pixel electrodes so that opening ratio of the device can be enhanced in a stable manner. The semiconductor pattern and the contact holes are formed together so that the processing steps can be simplified. Possible leakage of current can be prevented at the non-channel area using the black matrix. Furthermore, a buffer conductive layer is formed over the semiconductor pattern between the neighboring data lines, and an opening portion is formed at the common electrode over the semiconductor pattern so that current leakage can be completely prevented at the semiconductor pattern.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display, comprising:
   a first insulating substrate;
   a black matrix formed on said first substrate, said black matrix being mesh-shaped with opening portions at pixel areas and comprising a plurality of separated portions;
   an insulating layer formed on and covering both said first substrate and said black matrix;
   a gate line assembly formed on said insulating layer, said gate line assembly comprising gate lines proceeding in a horizontal direction, and gate electrodes connected to the gate lines;
   a gate insulating pattern formed on and covering both said insulating layer and said gate line assembly;
   a semiconductor pattern formed on said gate insulating pattern;
   an ohmic contact layer formed on said semiconductor pattern;
   a data line assembly formed on said ohmic contact layer, said data line assembly comprising a source electrode and a drain electrode separated from each other, and data lines connected to the source electrode while crossing over the gate lines to define the pixel areas; and
   a protective layer covering said data line assembly and said gate line assembly while exposing said gate insulating pattern, said semiconductor pattern, and portions of said insulating layer placed at the pixel areas; and
   buffer layers placed at the same plane as said gate line assembly or said data line assembly, each buffer layer covering a gap between the separated portions neighboring each other.

2. The method for fabricating a thin film transistor substrate for a liquid crystal display, comprising steps of:
   forming a black matrix on an insulating substrate, wherein the black matrix is mesh-shaped and has opening portions at pixel areas and comprising a plurality of separated portions;
   forming an insulating layer on the substrate such that the insulating layer covers the black matrix;
   forming a gate line assembly on the insulating layer, the gate line assembly comprising gate lines proceeding in a horizontal direction and gate electrodes connected to the gate lines, wherein said gate lines are narrower than the black matrix;

depositing a gate insulating layer onto the insulating layer;

depositing a semiconductor layer onto the gate insulating layer;

forming an ohmic contact layer on the semiconductor layer;

forming a data line assembly on the ohmic contact layer, the data line assembly comprising a source electrode and a drain electrode separated from each other, and data lines connected to the source electrode while crossing over the gate lines to define the pixel areas, wherein said data lines are narrower than the black matrix;

depositing a protective layer onto the substrate such that the protective layer covers the data line assembly and the gate line assembly; and forming opening portions exposing the insulating layer at the pixel areas by patterning the protective layer, the gate insulating layer and the semiconductor layer, wherein buffer layers are formed between the separate portions of the black matrix at the step of forming the gate line assembly or the data line assembly.

3. A liquid crystal display comprising:

a first insulating substrate;

a black matrix formed on said first substrate, said black matrix being mesh-shaved with opening portions at pixel areas;

an insulating layer formed on and covering both said first substrate and said black matrix;

a gate line assembly formed on said insulating layer, said gate line assembly comprising gate lines proceeding in a horizontal direction, and gate electrodes connected to the gate lines;

a gate insulating pattern formed on and covering both said insulating layer and said gate line assembly;

a semiconductor pattern formed on said gate insulating pattern;

an ohmic contact layer formed on said semiconductor pattern;

a data line assembly formed on said ohmic contact layer, said data line assembly comprising a source electrode and a drain electrode separated from each other, and data lines connected to the source electrode while crossing over the gate lines to define the pixel areas;

a protective layer covering said data line assembly and said gate line assembly while exposing said gate insulating pattern, said semiconductor pattern, and portions of said insulating layer placed at the pixel areas a second insulating substrate facing said first insulating substrate; and a common electrode formed on said second insulating substrate, the common electrode having opening portions over said semiconductor pattern between the neighboring data lines.

\* \* \* \* \*